(12) United States Patent
Mallon et al.

(10) Patent No.: US 11,502,846 B2
(45) Date of Patent: Nov. 15, 2022

(54) WHITEBOX COMPUTATION OF KEYED MESSAGE AUTHENTICATION CODES

(71) Applicant: KONINKLIJKE PHILIPS N.V., Eindhoven (NL)

(72) Inventors: Willem Charles Mallon, Eindhoven (NL); Sebastiaan Jacobus Antonius De Hoogh, Oosterhout (NL); Alan Pestrin, Salzburg (AT)

(73) Assignee: Koninklijke Philips N.V., Eindhoven (NL)

( * ) Notice: Subject to any disclaimer, the term of this patent is extended or adjusted under 35 U.S.C. 154(b) by 198 days.

(21) Appl. No.: 16/958,161

(22) PCT Filed: Dec. 24, 2018

(86) PCT No.: PCT/EP2018/086858
§ 371 (c)(1),
(2) Date: Jun. 26, 2020

(87) PCT Pub. No.: WO2019/129772
PCT Pub. Date: Jul. 4, 2019

(65) Prior Publication Data
US 2020/0366496 A1 Nov. 19, 2020

(30) Foreign Application Priority Data
Dec. 28, 2017 (EP) .................. 17210820.1

(51) Int. Cl.
*H04L 9/32* (2006.01)
*H04L 9/06* (2006.01)

(52) U.S. Cl.
CPC .......... *H04L 9/3242* (2013.01); *H04L 9/0643* (2013.01); *H04L 2209/16* (2013.01); *H04L 2209/30* (2013.01)

(58) Field of Classification Search
CPC . H04L 9/0643; H04L 9/3242; H04L 2209/16; H04L 2209/30
See application file for complete search history.

(56) References Cited

U.S. PATENT DOCUMENTS

2009/0327737 A1* 12/2009 Hsu ............ H04L 9/3247
713/181
2014/0019771 A1* 1/2014 Emmett ............ H04L 9/0643
713/189
2016/0380772 A1 12/2016 Gopal et al.

OTHER PUBLICATIONS

H. Krawczyk et al. HMAC: Keyed-Hashing for Message Authentication, IETF RFC 2014, http://www.ietf.org/rfc/rfc2104.txt.
S. Chow, P. Eisen, H. Johnson, P.C. van Oorschot. "White-Box Cryptography and an AES Implementation" In 9th Annual Workshop on Selected Areas in Cryptography (SAC 2002), Aug. 15-16, 2002, St. John's, Canada. Proceedings: pp. 250-270, Springer LNCS 2595 (2003).

(Continued)

Primary Examiner — David J Pearson

(57) ABSTRACT

Some embodiments are directed to a keyed message authentication code (MAC) device (100) for computing a keyed MAC for an input message using encoded representations. The keyed MAC device may be configured to apply a sequence of compressions functions, at least one of which takes a state as input in an encoded representation.

7 Claims, 7 Drawing Sheets

(56) References Cited

OTHER PUBLICATIONS

Secure Hash Standard, FIPS Pub 180-4, http://nvlpubs.nist.gov/nistpubs/FIPS/NIST.FIPS.180-4.pdf (Aug. 2015).
International Search Report and Written Opinion from PCT/EP2018/086858 dated Feb. 27, 2019.
Krawczyk IBM M Bellare UCSD R Canetti IBM H: "HMAC: Keyed-Hashing for Message Authentication; rfc2104.txt",HMAC: Keyed-Hashing FDR Message Authentication; RFC2104.txt, Internet Engineering Task Force, IETF; Standard, Internet Society (IS0C) 4, Rue Des Falaises CH-1205 Geneva, Switzerland, Feb. 28, 1997 (Feb. 28, 1997).
Positive Technologies: "Development and Implementation of HMAC in the Frame of the White-Box Cryptography Model", youtube,Jul. 2016 (Jul. 4, 2016), p. 1 pp. , XP054978441,Retrieved from the Internet: URL:https://www.youtube.com/watch?v=FAiz0_bWaac[retrieved on Jun. 20, 2018].
Denis Kolegov et al: "White-Box HMAC.Make your cipher secure to white-box attacks.", May 20, 2016 (May 20, 2016), pp. 1-22, XP055485749,Retrieved from the Internet: URL:https://de.sii deshare.net/yalegko/whitebox-hmac-make-your-cipher-secure-to-whitebox-attacks?from_action=save[retrieved on Jun. 19, 2018]p. 14-p. 22.

\* cited by examiner

WHITEBOX COMPUTATION OF KEYED MESSAGE AUTHENTICATION CODES

CROSS-REFERENCE TO PRIOR APPLICATIONS

This application is the U.S. National Phase application under 35 U.S.C. § 371 of International Application No. PCT/EP2018/086858, filed on Dec. 24, 2018, which claims the benefit of EP Patent Application No. EP 17210820.1, filed on Dec. 28, 2017. These applications are hereby incorporated by reference herein.

FIELD OF THE INVENTION

The invention relates to a keyed message authentication device, a keyed message authentication method, and a computer readable medium.

BACKGROUND OF THE INVENTION

A cryptographic primitive is called secure in the black-box model, if an attacker who only has knowledge of the inputs and outputs of the primitive cannot elevate his rights, e.g., obtain secret keys, encrypt messages, decrypt messages, etc. However, in practice attackers often do not operate in the black-box model, and in fact have more information than just the inputs and outputs. For example, in the grey-box model, it is assumed that an attacker has access to some information related to the execution of the primitive. These additional sources of information are called 'side-channels'. For example, side-channels include the amount of time that an operation took, or the amount of power that was consumed, etc. In an even stronger model, the so-called white-box model, and attacker has full access to all internal variables of the primitive. Attackers may also modify variables, even as the program is running Even so, the white-box implementation aims to prevent the extraction of secret keys from the program.

A keyed-hash message authentication code (HMAC) is a type of message authentication code (MAC) involving a cryptographic hash function and a secret cryptographic key. Like any MAC, an HMAC may be used to simultaneously verify both the data integrity and the authenticity of a message. HMAC does not encrypt a message. Instead, the message must be sent alongside with the HMAC hash. A receiving party that has the secret key computes the HMAC of the message himself, and if the message is authentic, the received and computed HMAC's will match.

When HMAC is embedded in mobile apps, it must be assumed that these devices may potentially be compromised. It is a problem of existing HMAC implementations that they do not provide measures to protect the secret cryptographic key. There is a desire for HMAC devices which have increased resistance in the grey or white-box model.

SUMMARY OF THE INVENTION

A keyed message authentication device is provided as defined in the claims. The device applies compression functions to a state to compute a message authentication code. At least some of the compression functions take an encoded state as input. States are derived from key material and may thus be sensitive. By encoding this information this risk is reduced. For example, in an embodiment, an inner hash and an outer hash is initialized with a state, any of these two states may be pre-computed and encoded. The compression function that operates on the initialized state may thus be configured to operate on an encoded state. In an embodiment, one or more compression functions, even if they operate on an encoded state may produce a plain state. This has the advantage that a subsequent compression function receives fewer encoded inputs. Fewer encoded inputs implies a faster execution and a smaller footprint, e.g., code size.

The keyed MAC device is an electronic device, e.g., a set-top box, a computer, etc. It may be a mobile electronic device, e.g., a mobile phone, tablet, smart-card. The keyed MAC method described herein may be applied in a wide range of practical applications. Such practical applications include the protection of messages for communication, financial transactions, sensor measurements, etc.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1a schematically shows an example of an embodiment of a keyed message authentication code device, FIG. 1b schematically shows an example of an embodiment of a keyed message authentication code device, FIG. 2 schematically shows an example of an embodiment of a fully encoded keyed message authentication code computation, FIG. 3a schematically shows an example of an embodiment of a partially encoded keyed message authentication code computation, FIG. 3b schematically shows an example of an embodiment of a partially encoded keyed message authentication code computation, FIG. 4 schematically shows an example of an embodiment of an encoded state initialization computation, FIG. 5 schematically shows an example of an embodiment of a keyed MAC method, FIG. 6a schematically shows a computer readable medium having a writable part comprising a computer program according to an embodiment, FIG. 6b schematically shows a representation of a processor system according to an embodiment.

LIST OF REFERENCE NUMERALS IN FIGS. 1A-4, 6A-6B 100, 101a keyed message authentication code device
110 a message management unit
120 a state initialization storage
130 an input interface for receiving the input message
140 a state initialization unit
142 an inner state computation unit
144 an outer state computation unit
150 an inner hash unit
152-156 an inner compression unit
160 an outer hash unit
162-164 an outer compression unit
212 an inner key block
214 an outer key block
220 a compression function
221-223 a message block
231-233 a first compression function
233' a compression function
242 an initialization vector (IV)
244 an initialization vector (IV)
252 a pre-computed state
254 a pre-computed state
261-263 a state
270 a compression function
281 a second compression function
290 a keyed MAC value
312 an inner key block
314 an outer key block
320 a compression function
321-323 a message block
331-333 a first compression function
342 an initialization vector (IV)
344 an initialization vector (IV)
352 a pre-computed state
354 a pre-computed state
361-363 a state
370 a compression function
381 a second compression function
390 a keyed MAC value
412 an encoded key
420 a compression function
470 a compression function
1000 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DETAILED DESCRIPTION OF THE EMBODIMENTS

Figure 1A:
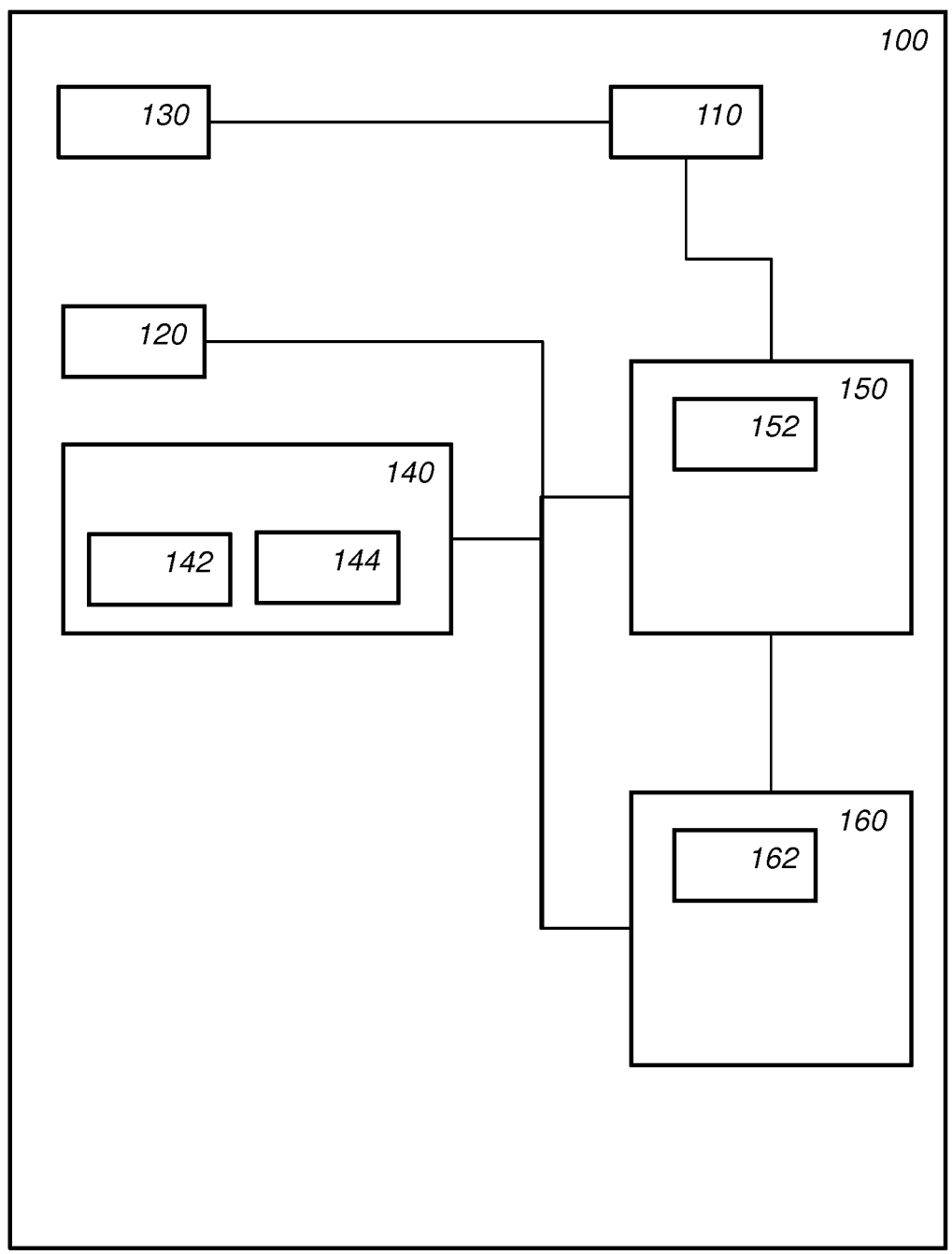

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

Popular cryptographic hash functions comprise repeated application of a one-way compression function, for example, in the popular Merkle-Damgård construction. The ingredients for this construction are a compression function $f: \{0,1\}^s \times \{0,1\}^b \to \{0,1\}^s$ and an "initial value" $IV \in \{0,1\}^s$. We will refer to bit strings of length b and s as "blocks" and "states", respectively. The number b is called the block length of the hash function.

A binary message M of arbitrary length is hashed as follows. First, bits are padded to M to arrive at a string M' of which the length is a multiple of b. In a typical manner of padding, first a '1' is placed after M, followed by a sequence of zeros to obtain a string of a length which is a multiple of b. Subsequently, a block of b bits representing the length of M is appended. Next, M' is partitioned in b-bits blocks, say $M'=(m_0\|K\|m_n)$ with $m_i \in \{0,1\}^b$ and $\|$ denoting concatenation. The hash of M, denoted by H(M), may be computed as follows.

$S_1 := f(IV, m_0)$;
for i:=1 to n do $S_{i+1} := f(S_i, m_i)$;
$H(M) := S_{n+1}$.

Stated in words: the compression function maps a state and a message block to a next state. Optionally, there is a post-processing function g such that $H(M)=g(S_{n+1})$.

When a hash function H is available, it may be used to define a keyed messaged authentication code. One particular implementation of a keyed hash function is the HMAC construction. Following [1], HMAC is described as follows:

$$HMAC(K,m) = H((K' \oplus opad) \| H(K' \oplus ipad \| m)).$$

In this formula, H, K and m denote the cryptographic hash function, the secret key, and the message to be authenticated. Furthermore, K' denotes another key, derived from K, so that K' matches the block length of H (obtained by padding some bits if the length of K is smaller than this block length, and by hashing if the length of K exceeds the block length). Finally, the inner padding string ipad and the outer padding string opad comprise repetitions of the hexadecimal constant 0x36 (that is, the byte 00110110) and 0x5C (that is, the byte 01011100) respectively, see [1]. Finally, $\oplus$ denotes bit-wise exclusive OR, and $\|$ denotes concatenation. If necessary, the message m is padded with zeros so that the message length is a multiple of the block length of the compression function.

In a direct implementation of a keyed HMAC, e.g., as described in [1], the key would be visible in memory. Accordingly, such an attack would be vulnerable to white-box type attacks. In fact, even a memory scraping attack, in which the strings in the memory are tried as the key, would be sufficient to recover the key. Embodiments are described in which the key is encoded, so that the key does not appear as such in memory. The hash function is performed in encoded form as well. Such embodiments provide excellent protection for the key, but turn out to be slow in practice. The inventors have realized that large parts of the HMAC computation do not have to be performed in encoded form. For example, in an embodiment, the hash function is computed by applying the compression function once with encoded input and plain output, followed by application of the compression function in the conventional, fast implementation, i.e., in the plain.

Figure 2:
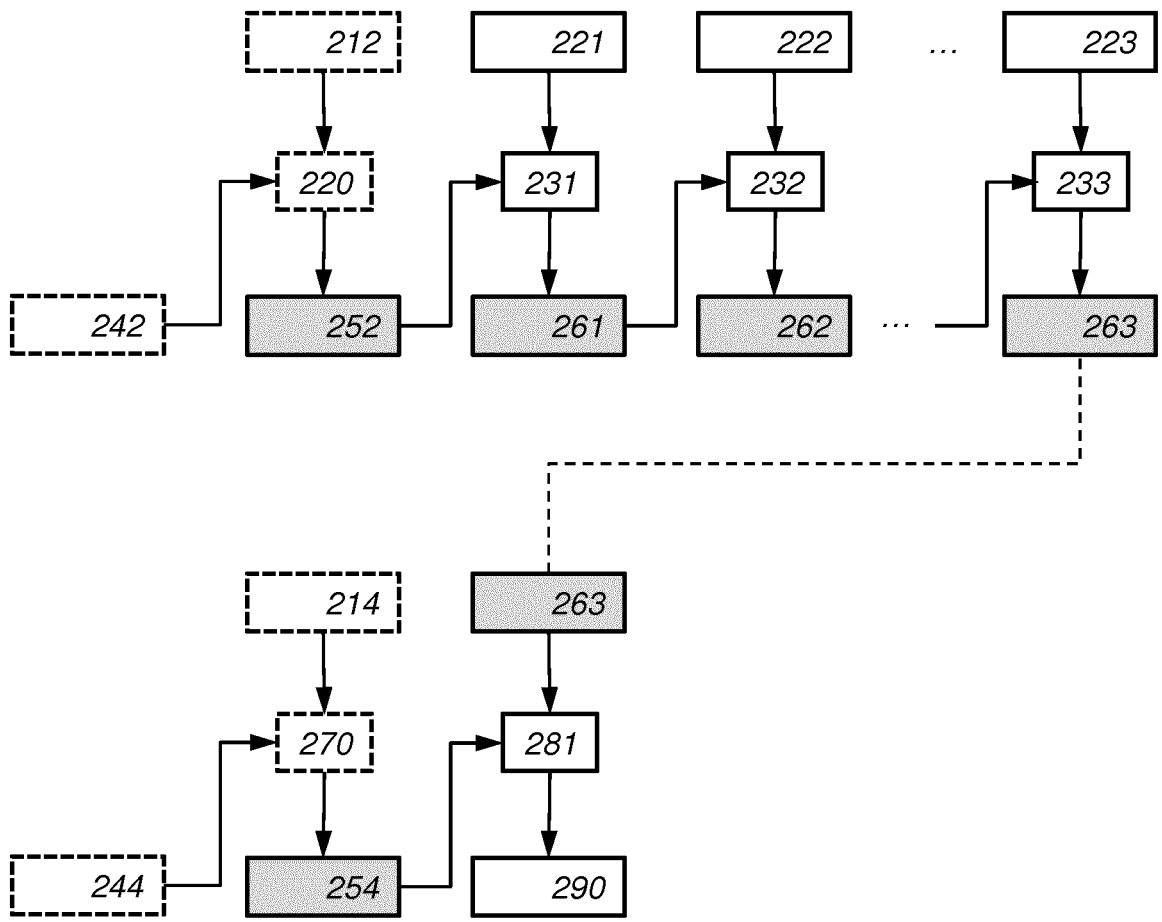

FIG. 1a schematically shows an example of an embodiment of a keyed message authentication code device 100. FIG. 2 schematically shows an example of an embodiment of a fully encoded keyed message authentication code computation, as it may be performed on device 100.

Keyed message authentication code device 100 is configured to compute a keyed MAC for an input message using encoded representations. We will use the HMAC construction as the main example for a keyed MAC, although the principles described herein may be applied to variants of the HMAC construction.

Some of the operations in device 100 are performed on encoded data to increase its resistance against grey-box and white-box attacks, e.g., attacks that assume that an attack has access to the contents of a computer's memory. A particular important attack-type which requires relatively little analysis on the part of the attacker are memory scraping attacks. In a memory scraping attack an attacker tries many sections of a memory to see if it happens to be sensitive information, in particular a key.

An operation embodied in computer program code that operates on plain data may be adapted or translated so that it instead operates on encoded data. This may use techniques known as white-box cryptography. We refer to plain data as data which is not encoded with a secret encoding, e.g., an encoding which is unknown to an attacker, e.g., a private encoding, e.g., private to device 100.

Implementations that resist white-box attacks, are sometimes implemented as an encoded table network operating on encoded data. In the paper "White-Box Cryptography and an AES Implementation" by S. Chow, et al. a white-box implementation of the block cipher AES (Advanced Encryption Standard) is presented (referred to as 'Chow' below and incorporated by reference herein). Chow forms an implementation of AES that consists entirely of table look-up operations. Through several intermediate methods, the normal cipher is transformed to an implementation in this form, so that a table-network can be used to compute AES. By encoding the tables in the table-network, the system's resistance against analysis and attack is increased. The techniques used in Chow can be applied to other cryptographic primitives as well.

As an alternative to tables, one may also use integer polynomials over a finite field. It is known that any function on bits, e.g., on nibbles or bytes, etc., may be represented as a polynomial over the corresponding finite field with characteristic 2. Instead of using tables to operate on encoded data, one may also apply a polynomial to operate on the encoded data. The encodings may be decided at compile time and may be different for each keyed MAC device. An encoded variable may be larger than a plain variable. For example, an encoding may be redundant, so that a variable has more than one valid representation. Keyed MAC device 100 comprises an input interface 130 for receiving the input message. Messages received through input interface 130 may be digital messages, e.g., received in electronic form. For example, input interface 130 may be an application programming interface (API) to receive the message. For example, input interface 130 may be an interface to an electronic memory of device 100 in which the message is stored. It will be assumed that the message is not encoded, although it could be. For example, the message may not need to be protected from white-box attacks, e.g., because it is public, because it will be sent in plain anyway, or because it is considered less sensitive than the key, etc.

Input interface 130 may be a communication interface arranged to receive the message. For example, device 100 may communicate with other electronic devices over a computer network. The computer network may be an internet, an intranet, a LAN, a WLAN, etc. Computer network may be the Internet. The computer network may be wholly or partly wired, and/or wholly or partly wireless. For example, the computer network may comprise Ethernet connections. For example, the computer network may comprise wireless connections, such as Wi-Fi, ZigBee, and the like. For example, the connection interface may comprise a connector, e.g., a wired connector, e.g., an Ethernet connector, or a wireless connector, e.g., an antenna, e.g., a Wi-Fi, 4G or 5G antenna. The communication interface may be used to receive a message, or at least part of a message, to compute a MAC over.

The message may be generated on device 100. For example, device 100 may be part of a messaging device, a financial device, a medical device, and the like. The device 100 may protect the (private) messages, financial transactions, and medical data by computing an HMAC over the data. This has the advantage that modification of the data can be detected by verifying the MAC. Furthermore, an attacker cannot simply re-compute the MAC for the modified data since he does not know the key. Recovering the key is hard due to the encoded representations.

Figure 1B:
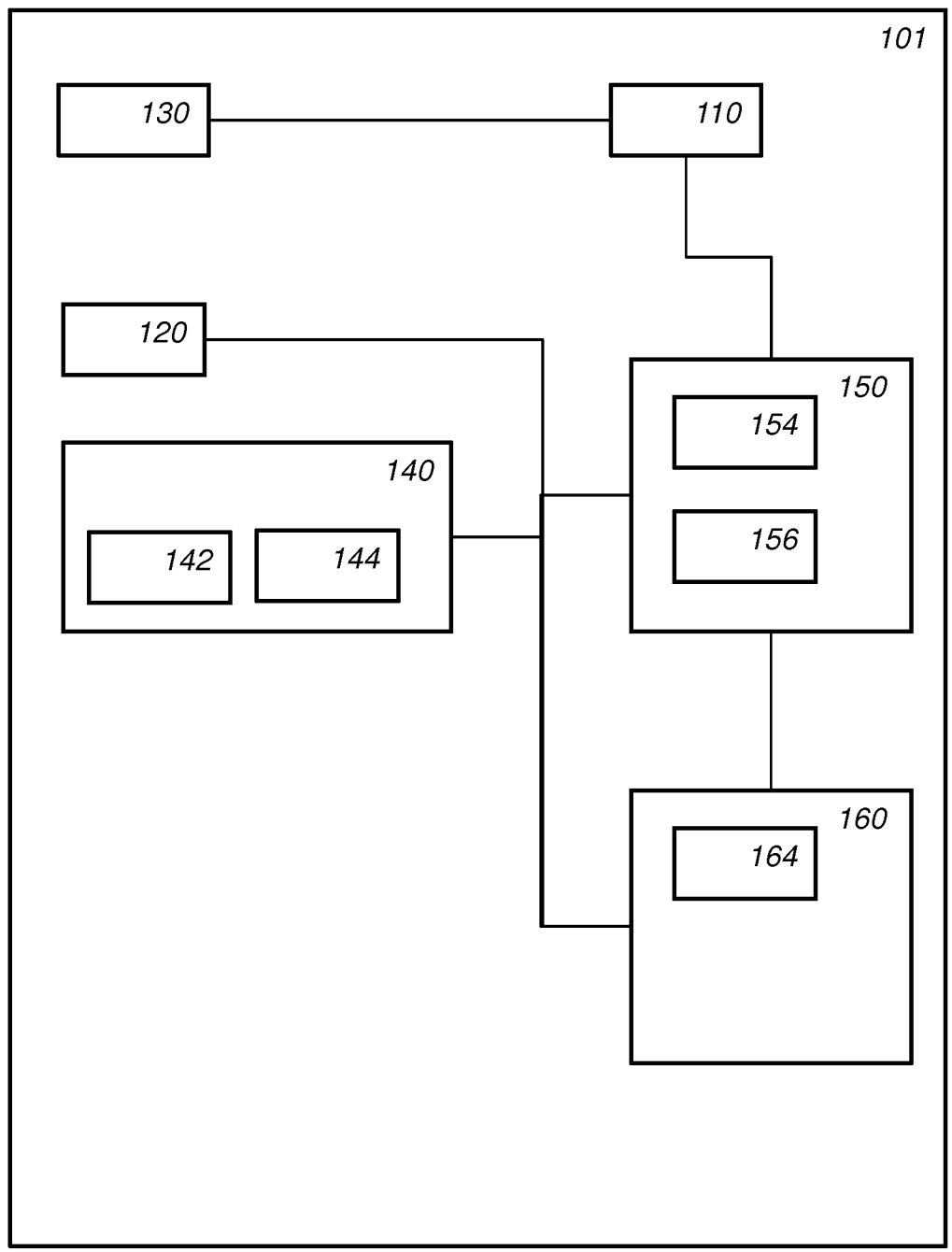

The execution of keyed MAC device 100, and keyed MAC device 101 (further discussed below) is implemented in a processor circuit, examples of which are shown herein. FIGS. 1a and 1b show functional units that may be functional units of the processor circuit. For example, FIGS. 1a and 1b may be used as a blueprint of a possible functional organization of the processor circuit. The processor circuit is not shown separate from the units in FIGS. 1a and 1b. For example, the functional units shown in FIGS. 1a and 1b may be wholly or partially be implemented in computer instructions that are stored at device 100, e.g., in an electronic memory of device 100, and are executable by a microprocessor of device 100. In hybrid embodiments, functional units are implemented partially in hardware, e.g., as coprocessors, e.g., crypto coprocessors, and partially in software stored and executed on device 100.

Keyed MAC device 100 may comprise a message management unit 110 configured to split the input message into one or more message blocks. Message management unit 110 may also be configured to pad the message, if needed, and to partition the message into blocks. In particular, the compression functions in inner hash unit 150 (described below) may expect a particular block size and/or padding. This may be provided by message management unit 110. Message management unit 110 may pad the message if needed, say, for the hashing. Padding is optional, e.g., the input message may already be padded.

If the message received at input interface 130 does not follow the requirements of the keyed MAC that is used, or of the hash functions that are used in it, then message management unit 110 can apply the padding and partitioning. For example, RFC 6234 describes hash functions which are suitable for use in HMAC. It is described how the message is to be padded, and how it is to be divided into blocks. Message management unit 110 is optional. For example, the message received at interface 130 may already be in the correct form. For example, it may be a single block which is correctly padded. Message management unit 110 need not operate on encoded data since the message is not encoded.

Keyed MAC device 100 comprises an inner hash unit 150 and an outer hash unit 160. Both inner hash unit 150 and outer hash unit 160 apply compression functions to a state. Inner hash unit 150 is configured to repeatedly update a state based on the message blocks that it receives from message management unit 110. In particular, inner hash unit 150 applies a sequence of first compressions functions to the state. The first compression functions take a state and a message block as input, and produce a new state. By applying the compression to a sequence of message blocks, the state is repeatedly updated. Inner hash unit 150 produces an inner hash, e.g., as the value of the state after the last first compression function is applied.

In general, compression functions may be the compression function of a hash function, e.g., the compression functions of the SHA family. A compression function may satisfy the following properties: it is infeasible to compute an input message block from the state output, even if the input state is known, and even if the plain states are known; it is infeasible to compute two input message blocks and an input state such that the compression function produces the same new state from each input message block. Furthermore, it is desirable that the compression function is also pre-image resistant for the state, e.g., given an output state and an input message it is infeasible to produce an input state. Standard compression function satisfy these requirements.

Outer hash unit 160 is configured to apply one or more second compression functions. The second compression functions take a state and a block of the inner hash as input and produces a new state. In a typical embodiment, there will be multiple message blocks, and thus multiple first compression functions, but the inner hash will be a single block so that there is one second compression function. Many of the compression functions can be the same, e.g., in FIG. 2, all of the first compression functions are the same function, and can also be implemented by shared code.

At least one of the first compression functions and at least one of the second compression functions take the state as input in an encoded representation.

Before the state is updated by the compression functions of inner hash unit 150 or by outer hash unit 160, it is initialized. For example, initialization of the state may be stored in a memory of device 100.

The initialization of the state may be done in various ways, two of which are shown in FIG. 1. For example, device 100 may comprise state initialization storage 120 storing initialization values for the state: an initialization value for the inner hash unit 150, and an initialization value for the outer hash unit 160. In an embodiment, the initialization values for the state are in encoded form.

Figure 3A:
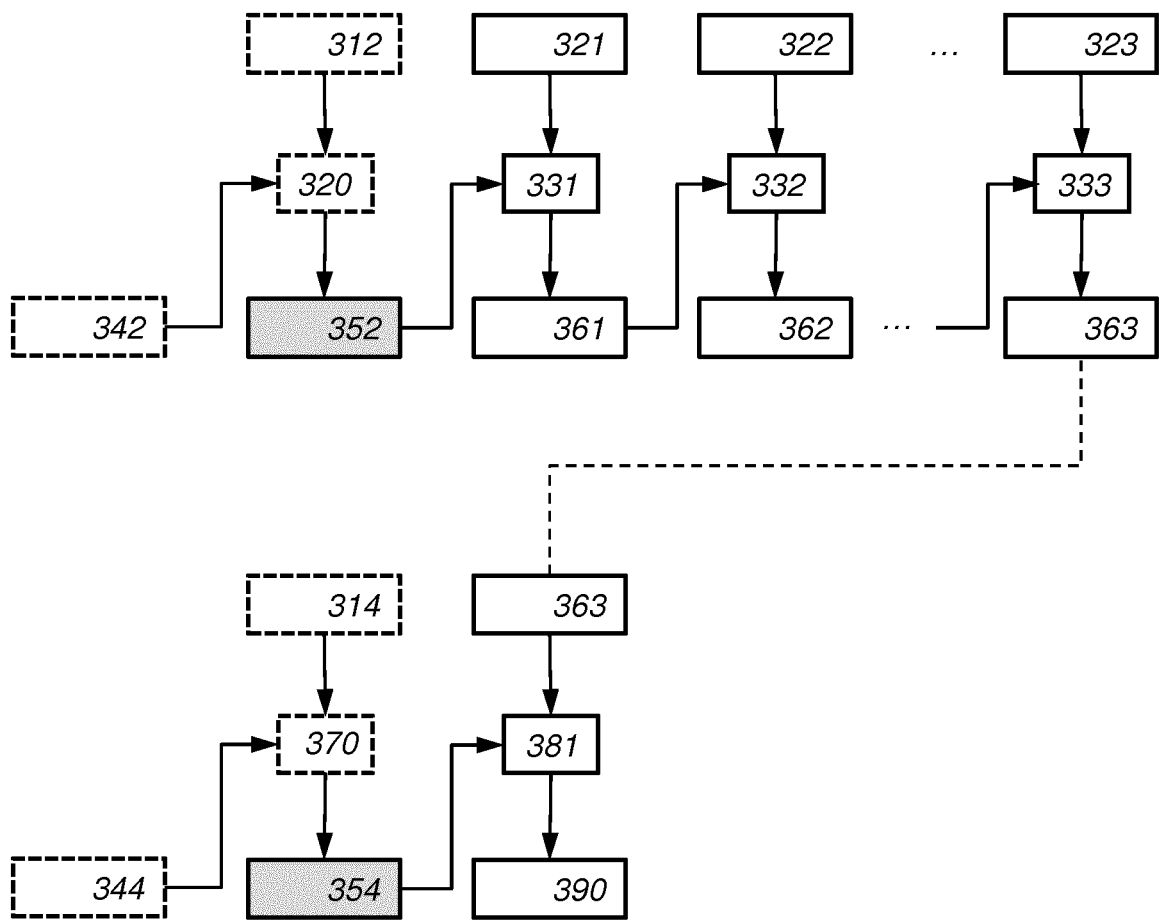
Figure 3B:
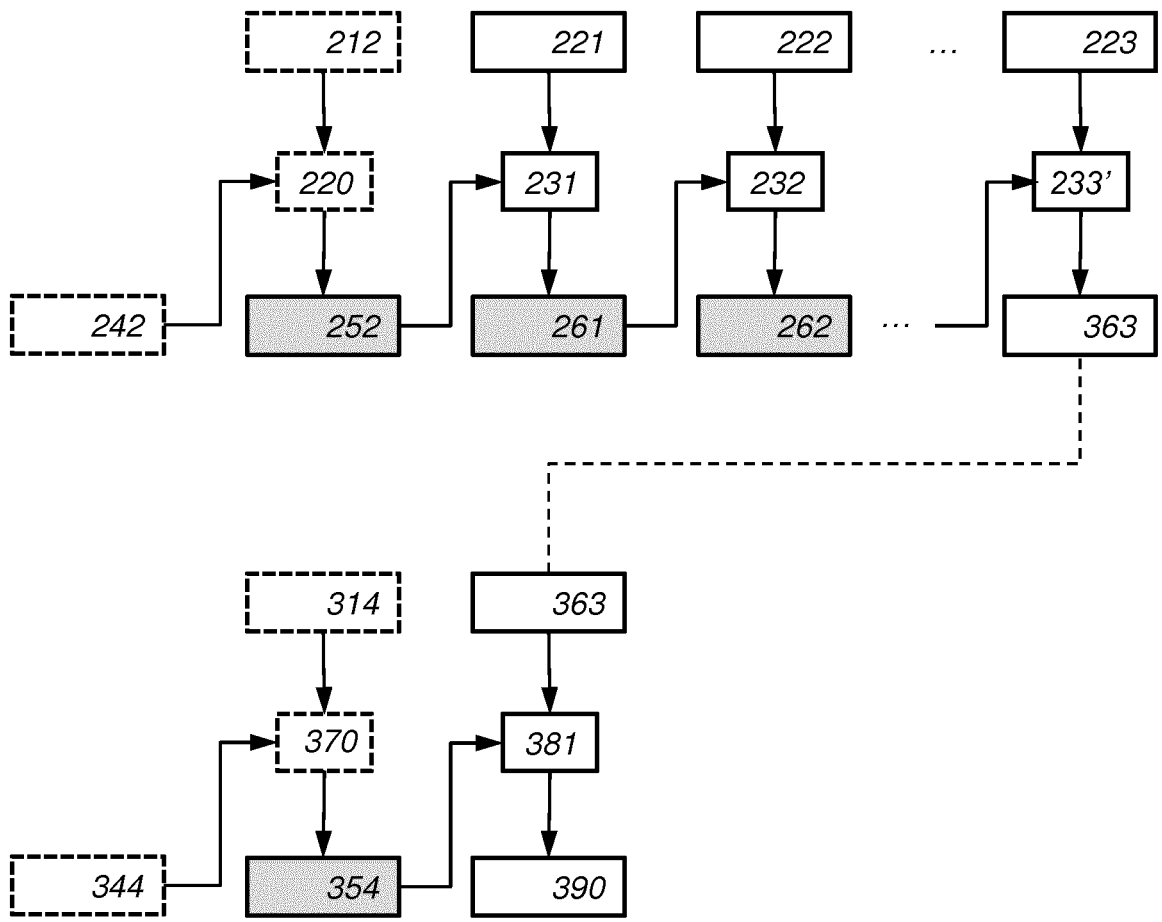

FIG. 2 shows how device 100 may compute a MAC. For example, the initialization of the states may be computed as shown in FIG. 2. In FIGS. 2, 3a, 3b and 4 grey boxes refer to encoded data, and dashed boxed refer to data which may be pre-computed. In an embodiment, the dashed blocks in FIGS. 2, 3a, and 3b are not represented in device 100, but are computed elsewhere.

Shown in FIG. 2 is an initialization vector 242 (IV), an inner key block 212 and a compression function 220. For example, the state may be initialized in the inner hash computation to an encoded representation of applying a compression function to a pre-determined initialization block, e.g., IV and a first key block, e.g., K⊕ipad. The resulting pre-computed state 252, e.g., the state initialization value, may be stored in storage 120.

Shown in FIG. 2 is an initialization vector 244 (IV), an outer key block 214 and a compression function 270. For example, the state may be initialized in the outer hash computation to an encoded representation of applying a compression function to a pre-determined initialization block, e.g., IV and a second key block, e.g., K⊕opad. The resulting pre-computed state 254, e.g., the state initialization value, may be stored in storage 120.

These computations can be pre-computed, and may be performed at a secure location. For example, the computation may be done at compile-time, when the software for device 100 is generated. In this case there is no need for the computation to be performed on encoded data. For this reason the key blocks 212 and 214 are not greyed in FIG. 2. Note that the pre-computed states 252 and 254 which are stored in device 100 are encoded. For example, at compile time the key for which pre-computed states 252 and 254 are computed may be stored in a further device, say a server, so that a keyed MAC computed by the device can be verified. Device 100 may be provided with pre-computed states 252 and 254 during manufacture, or when the keyed MAC software is installed that implements the keyed MAC device. Pre-computed states 252 and 254 may be updated so that device 100 may compute a MAC for a different key. For example, pre-computed states 252 and 254 may be received over input interface 130.

Figure 4:
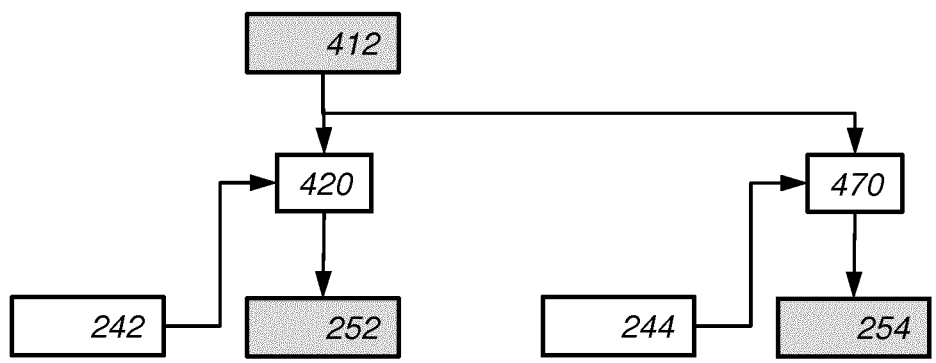

Instead of precomputing the states 252 and 254, these values may also be computed at device 100 when needed. For example, device 100 may comprise a state initialization unit 140 comprising an inner state computation unit 142 and an outer state computation unit 144. This computation is illustrated in FIG. 4.

For example, inner state computation unit 142 may receive an encoded key block 412, e.g., an encoded key block, and may be configured to apply a compression function 420. Compression function 420 is configured to receive as input the encoded key 412 and apply a compression function to it and to a fixed initialization vector 242. The latter need not be an input.

For example, outer state computation unit 144 may receive the encoded key 412 and may be configured to apply a compression function 470. Compression function 470 is configured to receive as input the encoded key 412 and apply a compression function to it and to a fixed initialization vector 244. The latter need not be an input. The encoded key 412 may be received, e.g., on input interface 130. Encoded key 412 may be generated on device 100. For example, by unit 140. For example, the key can be generated directly in encoded form.

Compression functions 420 and 470 receive the same encoded key. Compression function 420 and 470 are not the same, e.g., they are diversified. For example, in the case of HMAC, the compression functions 420 and 470 are hash compression functions except that they first add a different pad to the key, e.g., an ipad or opad.

In an embodiment, pre-computed state 252 is an encoded representation of applying a compression function (ƒ) to a pre-determined initialization block (Iv) and a first key block (K⊕ipad). In an embodiment, pre-computed state 254 is an encoded representation of applying a compression function (ƒ) to a pre-determined initialization block (Iv) and a second key block (K⊕opad).

Typically, device 100 will comprise only one of storage 120 and state initialization unit. Below we will assume that storage 120 is used, with the note that it may be replaced by a state initialization unit 140. Both units may also be used, for example, unit 140 may be used to pre-compute that state, which are then stored in storage 120. Returning to FIG. 2. At least one compression function of inner hash unit 150 and of outer hash unit 160 are configured to take an encoded input. Preferably, the first compression function applied by inner hash unit 150 and of outer hash unit 160 is configured to take an encoded input.

FIG. 2 shows three of the first compression functions of inner hash unit 150: compression functions 231, 232 and 233, taking message blocks 221, 222, and 223 as input respectively. There may be less or more message blocks than 3. The first compression functions each take an encoded state and a plain message block as input and produce an encoded state. Note that all first compression functions may be implemented by the same unit in device 100, e.g., an inner compression unit 152. The final state is encoded state 263. Although each of the states 252, 261-263 depend on the key, in particular on key block 212, an attacker who recovers any of these states cannot recover the key, e.g., because these blocks are encoded, and/or because they are the output of hash compression functions. The final state of the first compression functions, state 263, is the inner hash. In a hash construction a final function may be applied after the last compression function. If so such a function may be integrated in compression function 233. For example, if $f$ is the compression function, and, g the additional function, then block 233 may implement the function $g(f(\ ))$.

The inner hash 263 is used as input for an outer hash computation. This may require a further padding operation done on the inner hash. This padding may be done in compression function 233 or in compression function 281. For example, the further padding may be done in the additional function g. Thus compression function 233 may be adapted to produce the final block in padded and encoding form.

FIG. 2 shows one of the second compression functions of outer hash unit 160: compression function 281, taking inner hash blocks 263 as input. There may be more message blocks than 1, e.g., if the block length of the inner compression functions is larger than the block length of the outer compression functions. The second compression functions each take an encoded state and an encoded inner hash block as input and produce an un-encoded state. As the encodings differ, compression function 281 thus differs from compression functions 231-233—even if these compression functions come from the same hash function. If more second compression functions are needed, they can be chained as shown for the inner hash unit. State value 290 is the mac value. Compression function 281 may be executed by an outer compression unit 162. There may be a further operation on block 290. The further operation can be a plain un-encoded operation, executed on block 290. The further operation can be included in the compression function 281. If further padding of the inner hash is not done in compression function 233, it may be done by compression function 281.

In these embodiments compression function 281 is a bottleneck. This compression function takes two encoded inputs: encoded inner hash 263 and encoded state 254. The doubling of the number of encoded inputs roughly squares the size of an encoded implementation. Compression function 281 is thus significantly larger and slower than compression functions 231-233.

Note that in FIG. 2, the states are initialized to an encoded representation; both in the initial state 252 for the inner hash and in the initial state 254 for the outer hash. The initial compression functions 231 and 281 for the inner hash and for the outer hash thus take an encoded hash as input. In FIG. 2, all of the first compression functions take an encoded state as input and produce an encoded state. Only the final compression function 281 of the outer hash produces a state in a plain representation, i.e., un-encoded.

FIG. 1b schematically shows an example of an embodiment of a keyed message authentication code device 101, which alleviates this problem. An example of the computations done by device 101 is shown in FIG. 3. Device 101 is largely similar to device 100 except that the hash unit 150 and 160 implement different compression functions. Moreover, in device 101 the state is sometimes plain, when it is encoded in device 100. For example, inner hash unit 150 may comprise inner compression units 154 and 156. For example, outer hash unit 160 may comprise outer compression units 164. As shown below, units 154 and 164 may be shared between hash units 150 and 160.

Shown in FIG. 3, is the initialization of an inner state 352 and an outer state 354. These may be the same as for device 100. If states 352 and 354 were plain, the implementation would be vulnerable to an attack. Knowledge of the plain version of states 352 and 354 is sufficient to compute HMACs, even if the key itself is unknown. Accordingly, states 352 and 354 in FIG. 3 are encoded.

State 352 is updated with first compression functions of which 3 are shown: compression functions 331-333. The first of these compression functions: compression function 331 takes the encoded pre-computed state 352 as input and a plain message block 321. This is the same as in FIG. 2. However, the output of compression function 331, state 361, is plain. This is possible because a hash function has been applied to the encoded state 352. An attacker cannot compute the inverse of compression function 331, and thus knowledge of state 361 is not enough to obtain the ability to compute HMACs.

The remainder of the compression functions, e.g., compression functions 332 and 333 take a plain state, and a plain message block as input and produce a plain state as output. State 363, the inner hash, is also plain. Thus, inner hash unit 154 may implement compression function 331, and inner hash unit 156 may implement the rest of the compression functions: 332-333.

This means that the outer hash computation receives a plain inner hash. The compression function 381 of the outer hash computation receives only one encoded input, e.g., the encoded pre-computed state 354. Compression function 381 is not a bottleneck of this system, as it is just as fast and small as compression function 331. Moreover, the use of plain compression functions 332, and 333 makes the system much faster. Plain functions are orders of magnitude faster than encoded functions.

In an embodiment, device 101, e.g., in message management unit 110 may include information in the first message block that is used only once, e.g., a nonce, such as a time stamp. The nonce may be generated by message management unit 110, or it may be received, e.g., as a challenge. The nonce may be verified by a receiving party. For example, the nonce may be generated by a random number generator of the keyed MAC device. For example, in an embodiment, a challenge is received from an external computer at device 101, e.g., at interface 130, which is included in the message, e.g., in the first message block. When device 101 sends the message and HMAC to an external computer, the external computer may verify that the challenge is in the message and the HMAC is computed correctly.

Note that in FIG. 3a, the states are initialized to an encoded representation; both in the initial state 352 for the inner hash and in the initial state 354 for the outer hash. The initial compression functions 331 and 381 for the inner hash and for the outer hash thus take an encoded hash as input. In FIG. 3a, the initial first compression function 331 of the sequence of first compressions functions in the inner hash computation takes the state as input in an encoded representation. The remainder of the first compression functions take an un-encoded state as input and produce an un-encoded state. In particular, the final first inner compression function 333 produces an un-encoded state. The initial compression function 281 of the outer hash receives an encoded state and plain block of the inner hash and produces a state in a plain representation. If there are multiple compression functions for the outer hash they may be plain functions, except for the first second compression function.

FIG. 3b shows yet a further variant. FIG. 3b is largely the same as FIG. 2, in the first inner compression functions are used which take an encoded block and a plain message block. However, the final compression function is replaced by compression function 233'. Compression function 233' takes an encoded state, a plain message block and produces a plain state 363. For example, compression function 233' may be the same as compression function 331, except that compression function 233' may compute an additional final function, or further padding for the outer hash. An advantage of FIG. 3b is that more of the computation is performed on encoded data, while still the bottleneck of compression function 281 is avoided.

Note that in FIG. 3b, the states are initialized to an encoded representation; both in the initial state 252 for the inner hash and in the initial state 354 for the outer hash. The computation of the outer hash in FIG. 3b is the same as in FIG. 3a. The initial compression functions 231 and 381 for the inner hash and for the outer hash take an encoded hash as input. In FIG. 3b, the initial first compression function 231 of the sequence of first compressions functions in the inner hash computation takes the state as input in an encoded representation and produces an encoded state. The remainder of the first compression functions, e.g., compression function 232, also take an encoded state as input and produce an encoded state. The final compression function 233' of the first compression functions takes an encoded state as input and produces an un-encoded state.

In the various embodiments of devices 100, and 101, the input interface may be selected from various alternatives. For example, the interface may be a network interface to a local or wide area network, e.g., the Internet, a storage interface to an internal or external data storage, a keyboard, an application interface (API), etc.

The devices 100, and 101 may have a user interface, which may include well-known elements such as one or more buttons, a keyboard, display, touch screen, etc. The user interface may be arranged for accommodating user interaction for performing a MAC action to protect a message.

Storage of devices 100 and 101, e.g., storage 120 may be implemented as an electronic memory, say a flash memory, or magnetic memory, say hard disk or the like. The storage may comprise multiple discrete memories together making up the storage. The storage may also be a temporary memory, say a RAM. In the case of a temporary storage 120, storage 120 contains some means to obtain data before use, say by obtaining them over an optional network connection (not shown).

Typically, devices 100 and 101 each comprise a processor circuit, e.g., a CPU, microprocessor, etc., (not separately shown) which executes appropriate software stored at the devices 100 and 101; for example, that software may have been downloaded and/or stored in a corresponding memory, e.g., a volatile memory such as RAM or a non-volatile memory such as Flash (not separately shown). Alternatively, the devices 100 and 101 may, in whole or in part, be implemented in programmable logic, e.g., as field-programmable gate array (FPGA). Devices 100 and 101 may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

In an embodiment, devices 100 and 101 comprises an inner hash circuit, and an outer hash circuit. The circuits implement the corresponding units described herein. The circuits may be a processor circuit and storage circuit, the processor circuit executing instructions represented electronically in the storage circuits.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Below additional details and/or further embodiments are described.

In this first section, we describe a fully encoded implementation of HMAC using techniques that are typical for creating white box implementations of a cryptographic algorithm [2]. To simplify the description, we will assume that s=256, and b=512 as, e.g., is the case for the SHA-256 hash function [3, Sec. 4.1.2].

Let H be a hash function with compression function $f$, with block length b and state length s, and initial value IV. Let s≤t and let E: $\{0,1\}^t \to \{0,1\}^S$ be a surjection, that is, for each y∈$\{0,1\}$s there is at least one x∈$\{0,1\}^t$ such that E(x)=y. The function E may be regarded as a decoding function. Let $h_E$: $\{0,1\}^t \times \{0,1\}^b \to \{0,1\}^t$ be such that $$E(h_E(x,m))=f(E(x),m) \text{ for all } x\in\{0,1\}^t, m\in\{0,1\}^b$$

So $h_E$ has as input an encoded state x and a message block m, and gives as output an encoded state. The function $u_E$: $\{0,1\}^t \times \{0,1\}^t : 1\{0,1\}$s may be defined as, $$u_E(x,m)=f(E(x),pad(E(m))) \text{ for all } x\in\{0,1\}^t, m\in\{0,1\}^t$$

where pad is the standard padding function, for turning an s-bits state into an b-bits message block.

We below describe in pseudo-code how to compute HMAC(K,m) using $g_E$, where m (possibly after padding) has length nb, say m=($m_1\|K\|m_n$). Note that n need not be known in advance. The key K' is the key of length b obtained by appending zeros to the end of K.

Let $S_1, T_0 \in \{0,1\}$ be such that $E(S_1)=f(IV,K'\oplus ipad)$ and $E(T_0)=f(IV,K'\oplus opad)$ (May be pre-computed)
for i:=1 to n do $S_{i+1}:=h_E(S_i,m_i)$;
HMAC:=$u_E(S_{n+1},T_0)$ The correctness of this algorithm follows from the fact that $E(S_i)$ equals the state in the i-th iteration of the computation of the hash function applied to ($m_1\|K\|m_n$). A disadvantage of this fully encrypted implementation is that experiments showed that it is rather slow.

This section describes a partially encoded implementation. Let H be a hash function with compression function $f$, with block length b and state length s, and initial value IV. Let s≤t, and let $E:\{0,1\}^t \to \{0,1\}^s$ be a surjection, that is, for each $y \in \{0,1\}^s$ there is at least one $x \in \{0,1\}^t$ such that $E(x)=y$. The function $g_E:\{0,1\}^t \times \{0,1\}^b \to \{0,1\}^s$ is defined as $$g_E(x,m) = f(E(x),m) \text{ for all } x \in \{0,1\}^t, m \in \{0,1\}^b.$$

We below describe in pseudo-code how to compute HMAC(K,m) using $g_E$, where m (possibly after padding) has length nb, say $m = (m_1 \| K \| m_n)$. The key K' is the key of length b obtained by appending zeros to the end of K.

Let $S_1, T_0 \in \{0,1\}^t$ be such that $E(S_1) = f(IV, K' \oplus ipad)$ and $E(T_0) = f(IV, K' \oplus opad)$ (May be pre-computed)
$S_2 := g_E(S_1, m_1)$;
for i:=2 to n do $S_{i+1} := f(S_i, m_i)$;
Write $S_n = (u_1 \| K \| u_k)$ with $u_1 \in \{0,1\}^b$
(Further padding may be applied to $S_n$ if necessary;

$$k = \lceil \tfrac{s}{b} \rceil,$$

that is, s/b rounded upwards)
$T_1 := g_E(T_0, u_1)$;
for i:=2 to k do $T_i := f(T_{i-1}, u_i)$;
HMAC:=$T_k$.

The further padding may be incorporated in the final inner compression function or in the first outer compression function. Note that in the above algorithm, the fast, plain implementation $f$ is applied n+k−2 times; the slower encoded implementation $g_E$ is used only twice. If $f$ denotes the SHA-256 function, then b=512, s=256, k=1. Other hash functions may be accommodated by making the appropriate changes to b, s and k.

Practically, the above is applied as follows.

(1) A designer chooses t s and a surjection $E:\{0,1\}^t \to \{0,1\}^s$ and creates an implementation of $g_E$ that in the computation of $g_E(x,m) = f(E(x),m)$ does not contain $E(x)$ as internal variable. That is, E is integrated in the implementation of $g_E$. Note that the implementation of $g_E$ can contain additional bijections, chosen independently from E, for hiding of and computing with internal variables. For example, the function $g_E$ may implement the compression function of the SHA-256 hash function.

(2) Given a key K (chosen by the designer, or given to him), the designer provides a key file containing $S_1$ and $T_0$ such that $E(S_1) = f(IV, K' \oplus ipad)$ and $E(T_0) = f(IV, K' \oplus opad)$.

Because of the separation of the key file and the implementation of $g_E$, a key can be updated without the need to make other changes. As E is secret, $S_1$ does not reveal $f(IV, K' \oplus ipad)$, and $T_0$ does not reveal $f(IV, K' \oplus opad)$. Pre-computation of $f(IV, K' \oplus ipad)$ and $f(IV, K' \oplus opad)$ is possible.

REFERENCES

Figure 5:
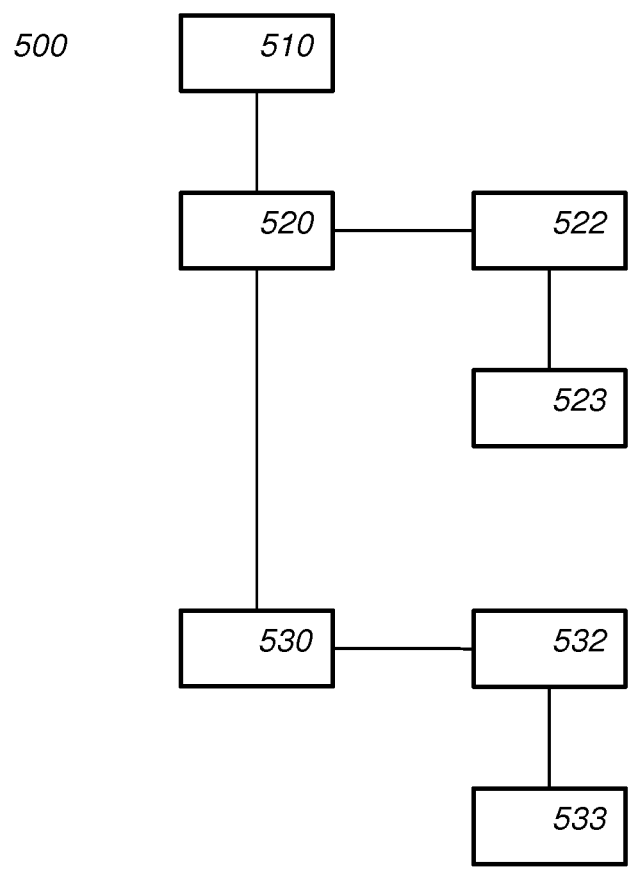

[1] HMAC: Keyed-Hashing for Message Authentication, IETF RFC 2014, http://www.ietf.org/rfc/rfc2104.txt
[2] S. Chow, P. Eisen, H. Johnson, P. C. van Oorschot. "White-Box Cryptography and an AES Implementation" In 9th Annual Workshop on Selected Areas in Cryptography (SAC 2002), Aug. 15-16 2002, St. John's, Canada. Proceedings: pp. 250-270, Springer LNCS 2595 (2003)
[3] Secure Hash Standard, FIPS PUB 180-4, http://nvlpubs.nist.gov/nistpubs/FIPS/NIST.FIPS.180-4.pdf FIG. 5 schematically shows an example of an embodiment of a keyed MAC method 500. Keyed message authentication code (MAC) method 500 is arranged for computing a keyed MAC for an input message using encoded representations. Keyed MAC method 500 comprises receiving (510) the input message and splitting the input message into one or more message blocks, performing (520) an inner hash computation, comprising
  initializing (522) a state based on a cryptographic key,
  applying (523) a sequence of first compressions functions ($h_E; g_E$), first compression functions taking the state and a message block as input and producing a new state, at least one of the first compression functions taking the state as input in an encoded representation, performing (530) an outer hash computation, comprising
  initializing (532) a state based on the cryptographic key,
  applying (533) one or more second compression functions ($u_E; g_E$), second compression functions taking the state and a block of the inner hash as input and producing a new state, at least one of the second compression functions taking the state as input in an encoded representation.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. Moreover, a given step may not have finished completely before a next step is started.

A method according to the invention may be executed using software, which comprises instructions for causing a processor system to perform method 500. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 6A:
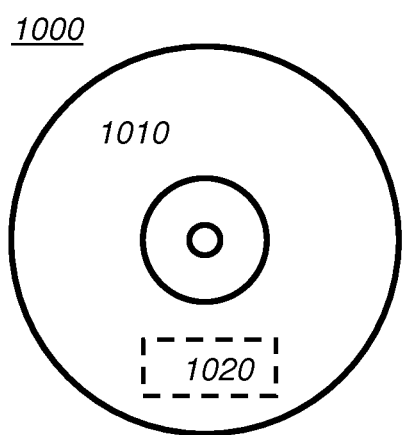

FIG. 6a shows a computer readable medium 1000 having a writable part 1010 comprising a computer program 1020, the computer program 1020 comprising instructions for causing a processor system to perform a keyed MAC method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said keyed MAC method.

Figure 6B:
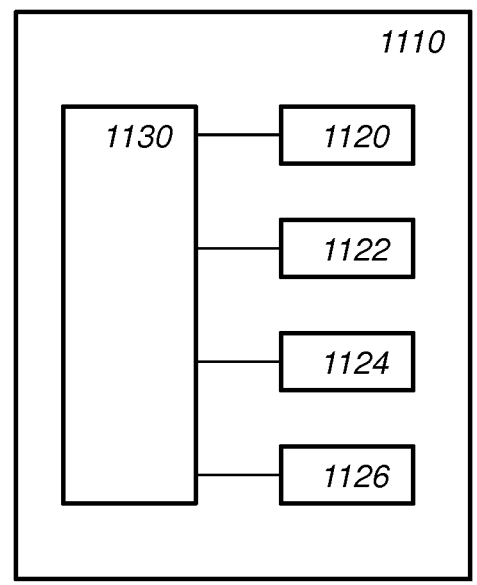

FIG. 6b shows in a schematic representation of a processor system 1140 according to an embodiment of a keyed MAC device. The processor system comprises one or more integrated circuits 1110. The architecture of the one or more integrated circuits 1110 is schematically shown in FIG. 6b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., the keyed MAC device, may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software. It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A keyed message authentication code device for computing a keyed message authentication code using encoded and un-encoded representations, the keyed message authentication code device comprising:
an input interface circuit,
wherein the input interface circuit receives an input message;
a memory circuit,
wherein the memory circuit is arranged to store a first encoded state and a second encoded state;
a processor circuit, wherein the processor circuit:
splits the input message into a plurality of message blocks,
sequentially applies a plurality of inner hash computations to the corresponding plurality of message blocks,
wherein each inner hash computation receives a state input, a message block, and provides a state output,
wherein the state output of each inner hash computation is provided as the state input to a next-sequential inner hash computation,
wherein the plurality of inner hash computations comprises at least a first set of inner hash computations and a second set of inner hash computation,
wherein the state input of the first set of inner hash computations is the first encoded state,
wherein the state output of the first set inner hash computations is un-encoded,
wherein the state input of the second set of inner hash computations is un-encoded,
wherein the state output of the second set of inner hash computations is un-encoded,
applies an outer hash computation based on the second encoded state and the state output of the second set of inner hash computations to provide the keyed message authentication code.

2. The keyed message authentication code device as in claim 1, wherein the processor circuit is configured to include a nonce in the message.

3. The keyed message authentication code device as in claim 1, wherein the keyed message authentication code is an HMAC.

4. A keyed message authentication code method for computing a keyed MAC for an input message using encoded and un-encoded representations, the keyed message authentication code method comprising, at a keyed MAC device:
receiving an input message;
splitting the input message into a plurality of message blocks;
accessing a first encoded state and a second encoded state stored within the keyed MAC device,
sequentially applying a plurality of inner hash computations to the corresponding plurality of message blocks,
wherein each inner hash computation receives a state input, a message block, and provides a state output,
wherein the state output of each inner hash computation is provided as the state input to a next-sequential inner hash computation,
wherein the plurality of inner hash computations comprises at least a first set of inner hash computations and a second set of inner hash computation,
wherein the state input of the first set of inner hash computations is the first encoded state,
wherein the state output of the first set inner hash computations is un-encoded,
wherein the state input of the second set of inner hash computations is un-encoded, wherein the state output of the second set of inner hash computations is un-encoded, applying an outer hash computation based on the second encoded state and the state output of the second set of inner hash computations to provide the keyed message authentication code.

5. The method of claim 4, wherein a nonce is included in the message.

6. The method of claim 4, wherein the keyed message authentication code is an HMAC.

7. A non-transitory computer-readable medium comprising a program that, when executed by a processor, causes the processor to:

receive an input message;

split the input message into a plurality of message blocks;

access a first encoded state and a second encoded state stored within a memory circuit, sequentially apply a plurality of inner hash computations to the corresponding plurality of message blocks, wherein each inner hash computation receives a state input, a message block, and provides a state output, wherein the state output of each inner hash computation is provided as the state input to a next-sequential inner hash computation, wherein the plurality of inner hash computations comprises at least a first set of inner hash computations and a second set of inner hash computation, wherein the state input of the first set of inner hash computations is the first encoded state, wherein the state output of the first set inner hash computations is un-encoded, wherein the state input of the second set of inner hash computations is un-encoded, wherein the state output of the second set of inner hash computations is un-encoded, apply an outer hash computation based on the second encoded state and the state output of the second set of inner hash computations to provide the keyed message authentication code.

* * * * *